United States Patent [19]

Bohan, Jr.

[11] Patent Number: 4,546,918

[45] Date of Patent: Oct. 15, 1985

[54] CONTROL DEVICE WITH POSITIVE TEMPERATURE COEFFICIENT IMPEDANCE FOR LIMITING DISSIPATED POWER

[75] Inventor: John E. Bohan, Jr., Minneapolis, Minn.

[73] Assignee: Honeywell Inc., Minneapolis, Minn.

[21] Appl. No.: 625,484

[22] Filed: Jun. 29, 1984

[51] Int. Cl.[4] ............................................. F23N 5/20
[52] U.S. Cl. .................................. 236/46 R; 307/66; 337/301
[58] Field of Search .................. 236/46 R, 75; 165/12; 307/66; 337/301–304; 361/163

[56] References Cited

U.S. PATENT DOCUMENTS

| | | | |
|---|---|---|---|
| 3,948,441 | 4/1976 | Perkins et al. | 307/66 X |
| 4,177,923 | 12/1979 | Krump . | |
| 4,215,815 | 8/1980 | Krump . | |
| 4,249,696 | 2/1981 | Donnelly et al. . | |
| 4,340,173 | 7/1982 | Kompelien . | |
| 4,365,167 | 12/1982 | Weimer et al. . | |

Primary Examiner—William E. Wayner
Attorney, Agent, or Firm—Clyde C. Blinn

[57] ABSTRACT

A control device for controlling temperature conditioning apparatus is connected to a thermostatic switch means having a circuit requiring a small current to maintain the circuit active during the open cycle of the thermostat switch means. A positive temperature coefficient resistor is placed in parallel with the input circuit of the control device to provide a low input impedance to the control device for maintaining the small current without activating the control device. During the operation of the thermostat with the switch closed, a larger current to the positive temperature coefficient resistor causes the resistor to increase in temperature and thus its impedance so the wattage dissipated by the PTC resistor is reduced to minimize the heat dissipation and thus the temperature of the control.

5 Claims, 2 Drawing Figures

4,546,918

CONTROL DEVICE WITH POSITIVE TEMPERATURE COEFFICIENT IMPEDANCE FOR LIMITING DISSIPATED POWER

BACKGROUND AND SUMMARY OF THE INVENTION

Generally, control devices for temperature conditioning apparatus are made with a high input impedance to reduce the current flow and thus reduce the heat generated in the control device to maintain its operating temperature within certain required limits. When such control devices are used with thermostatic switching devices or thermostats having circuits requiring a small "trickle" current for maintaining the circuit active during the off or open cycle of the thermostat, a high impedance control device may interpret a small "trickle" current as a call for operation of the control device. The "trickle" current might be used to charge batteries during the off cycle of the thermostat or maintain certain resistance capacitance (RC) circuits energized for standby power in the case of a power failure.

The present invention is concerned with a control device having a positive temperature coefficient (PTC) impedance which changes impedance with temperature. During the off cycle of the thermostat, when only the "trickle" current passes through the control device, the PTC impedance is low and a fairly large trickle current can exist. Upon a call for heat by the thermostat to bypass the trickle current circuit and deliver a larger current to the control device, the temperature of the PTC impedance will increase and thus its impedance will increase to reduce the wattage dissipated in the control device limiting the temperature of the control device within predetermined required limits.

DESCRIPTION OF THE INVENTION

Figure 1:
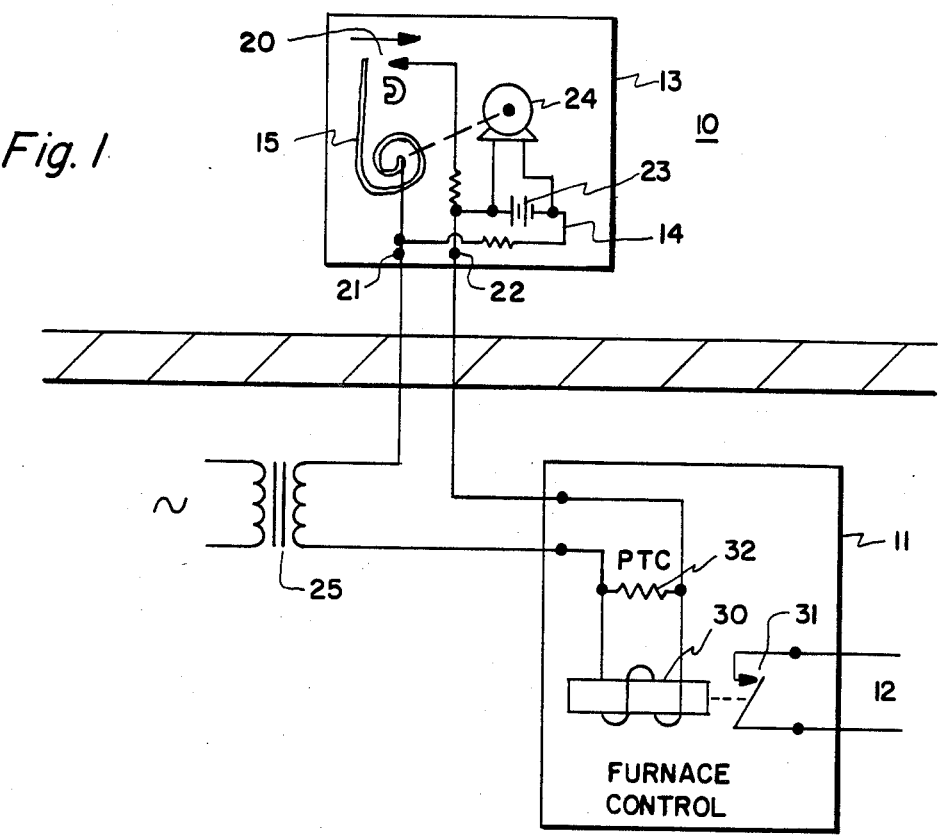
FIG. 1 is a schematic representation of one particular application of the present invention.

Referring to FIG. 1, space 10 might be a living quarters of a conventional dwelling. The space temperature is controlled by receiving temperature conditioned medium from a temperature conditioning apparatus or furnace adapted to be connected to a furnace control 11 at an output circuit 12. Located in space 10 is a thermostat or temperature responsive switch means 13 of a conventional type having a power storing circuit 14 requiring a small "trickle" current for maintaining the circuit active during an open cycle of the thermostat. Specifically, temperature responsive element or bimetal 15 operates a switch 20 to close a circuit between the output terminals 21 and 22 of the thermostat. Connected between the output terminals is a battery 23 for supplying current to a motor 24 for operating the thermostat. Circuit 14 might be a battery for powering a motor in a temperature setback thermostat such as the T8082 Thermostat manufactured by Honeywell Inc. or an RC circuit for maintaining a voltage which can be used upon the loss of power of the thermostat to maintain a memory in the thermostat as done in the T8100 and T8200 Thermostats manufactured by Honeywell Inc. In either case, circuit 14 requires a "trickle" current during the open or off cycle of thermostat switch 20 from the power supply 25 for maintaining the circuit 14 active.

Furnace control 11 comprises a high impedance actuator 30 for operating a switch 31 to bring about operation of the temperature conditioning apparatus. Normally, control 30 is preferred to have a low impedance as a high impedance would make it difficult to distinguish between the normal operating current when the thermostat switch 20 was closed and the "trickle" current passing through circuit 14.

Connected in parallel with relay winding 30 is a positive temperature coefficient (PTC) resistor 32 which has a low resistance when the temperature of the resistor is low and as the temperature increases, the resistance increases. During the normal off cycle of thermostat switch 20, when only the "trickle" current of circuit 14 passes through resistor 32, the temperature of the resistor remains low and its resistance is low so that a sufficient "trickle" current is obtained to maintain battery 23 charged. Upon a call for heat by thermostat switch 20, a higher current supplied from power supply 25 raises the temperature of resistor 32 and thus an increased resistance to decrease the wattage dissipation of the PTC resistor. Less heat generated keeps the temperature of the control device 11 within certain required limits.

Figure 2:
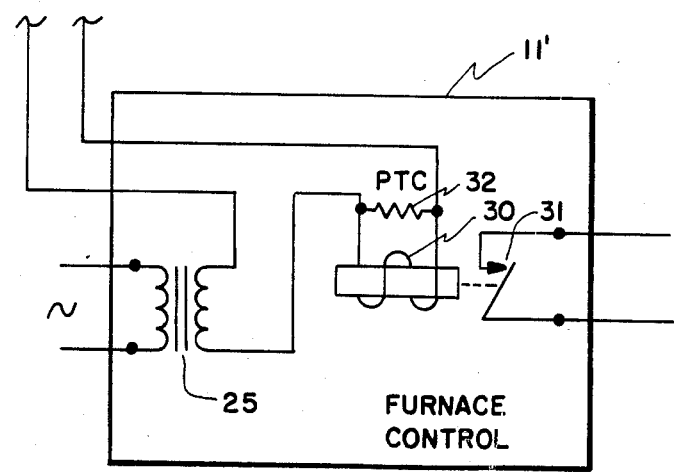
FIG. 2 is another showing of the present invention.

In FIG. 2, control device 11' contains the power supply 25 as well as the relay 30 and PTC resistor 32. The placement of the power supply in the control panel with the relay or outside would be a matter of design as, in some cases, the heat dissipation from the transformer or power supply 25 would cause the temperature of the control device to become excessive.

OPERATION OF THE INVENTION

During the normal off cycle of the temperature control system of FIG. 1, a "trickle" current is supplied to the circuit 14 for charging battery 23 through a low resistance or impedance PTC impedance 32. The magnitude of the "trickle" charge maintains the battery charged. The heat dissipated through PTC impedance 32 is small with this "trickle" charge. Upon a call for a change in the temperature of space 10 and the closing of the thermostat switch 20, a higher current passes to the control device 11. The high current passes through the PTC impedance causing its temperature to be increased and its resistance or impedance to decrease. Without this increase in impedance, the wattage dissipated through conventional impedance 32 would result in an excessive temperature build up in the controlled apparatus which is set by certain limitations, especially when the control apparatus is used in a high ambient temperature. By use of the PTC impedance, the increase in impedance results in less current passing through impedance 32 and less wattage being dissipated to minimize the rise in the control device temperature and maintaining its temperature rise within the specified limits.

The embodiments of the invention in which an exclusive property or right is claimed are defined as follows:

1. An improvement in a high impedance control device having a source of power and adapted to be connected to a temperature conditioning apparatus for supplying temperature conditioned medium to a space and adapted to be connected to a space thermostat switch device having a circuit requiring a small "trickle" current for maintaining the circuit active during the open cycle of the thermostat switch wherein during a close cycle of the thermostat switch high current flow in the control device results in a high amount of heat dissipation in the control device, the improvement comprising, a positive temperature coefficient impedance means, and means connecting said positive temperature coefficient impedance means in said high impedance control device so that upon said switch device being open a low input impedance exists at said control device to produce a significant trickle current and upon said switch device being closed said impedance means increases in temperature due to current flow and its impedance increases to reduce said current flow and to reduce the wattage dissipated in the control device.

2. In a control apparatus comprising, high impedance control means adapted to control temperature conditioning apparatus supplying temperature conditioned medium to a space, positive temperature coefficient impedance means connected in parallel with said control means across its input terminals, and means adapted to connect said input terminals to a source of power and a remote space temperature responsive switch means having a circuit maintained active upon receiving a current when said switch means is open, said current being supplied from the source of power through said positive temperature coefficient impedance means, said impedance means having a low impedance during said open cycle of said temperature responsive switch means to maximize said current and a high impedance during a closed cycle of said temperature responsive switch means when a high operating current exists to minimize a power consumption and thus heat generation in said control apparatus for limiting the operating temperature of said control apparatus.

3. The invention of claim 1 wherein, said circuit is a battery to be maintained in a charged state by said current.

4. In a temperature control system comprising, temperature responsive switch means adapted to be mounted in a space having a power storing circuit for furnishing power to a function of its operation, control apparatus adapted to be connected to a temperature conditioning apparatus to supply temperature conditioned medium to the space, a source of power, means including said source of power connecting said temperature responsive switch means to said control apparatus for energizing said control apparatus when said temperature responsive means calls for operation of the temperature conditioning apparatus to supply temperature conditioned medium to the space, said source of power furnishing a current to said power storing circuit when said switch means is open, and positive temperature coefficient impedance means having a low impedance when cold connected to said control apparatus to increase said current when said switch means is open; however, upon said thermostat switch closing a larger current through said impedance is limited as an increase in temperature of said impedance increases its resistance and thus its heat dissipation in said control apparatus.

5. In a control device in which the heat dissipation is to be limited to maintain the temperature of the control device within certain limits comprising, a high impedance actuator means adapted to be connected by an energizing current to a source of power providing a small current through said circuit, said actuator means adapted to control remote apparatus, and a positive temperature coefficient impedance means connected in said energizing circuit in parallel with said actuator means to allow a predetermined current to flow through said impedance and said energizing circuit and upon said predetermined current increasing said impedance means increases in temperture and impedance thereby limiting the power and thus heat dissipation of said impedance in the control device.

* * * * *

UNITED STATES PATENT AND TRADEMARK OFFICE
CERTIFICATE OF CORRECTION

PATENT NO. : 4,546,918

DATED : October 15, 1985

INVENTOR(S) : John E. Bohan, Jr.

It is certified that error appears in the above-identified patent and that said Letters Patent is hereby corrected as shown below:

In the specification, at column 2, line 46, delete "decrease" and substitute --increase--.

In claim 1, column 2, line 67, after "switch" insert --a--.

Signed and Sealed this

Thirty-first Day of December 1985

[SEAL]

Attest:

DONALD J. QUIGG

Attesting Officer

Commissioner of Patents and Trademarks